Feb. 26, 1946.   P. B. KELLER ET AL   2,395,667
METHOD OF RIVETING
Filed Dec. 31, 1943

PHILIP B. KELLER &
DONALD JELINEK
INVENTORS
BY
ATTORNEY

Patented Feb. 26, 1946

2,395,667

UNITED STATES PATENT OFFICE 2,395,667

METHOD OF RIVETING

Philip B. Keller, Santa Monica, and Donald Jelinek, Los Angeles, Calif., assignors to North American Aviation, Inc., Inglewood, Calif., a corporation of Delaware Application December 31, 1943, Serial No. 516,366

1 Claim. (Cl. 78—46)

This invention relates to the art of setting securing devices of the composite rivet type, wherein a shear-resistant, hardened pin has an integral head at one end and at its other end a head formed by a malleable collar embracing and forced into an annular groove in said other end. One of the objects of the invention is to provide an improved method of forming such a securing device head. Another object is to provide an improved tool for forming the head on a securing device of this type.

In the drawing, like reference characters designate similar parts in the several views.

Figure 1:
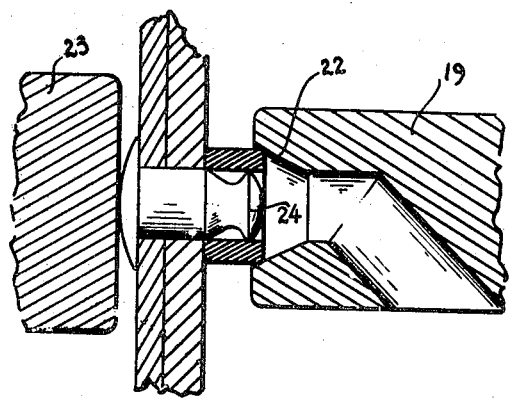
Fig. 1 is a sectional view illustrating the beginning of a rivet setting operation in accordance with the invention.

The present invention constitutes an improvement upon the art of riveting set forth in United States Letters Patent No. 2,355,579, granted Aug. 8, 1944, for method of riveting. The method disclosed in that application embodies the insertion of a hardened steel rivet pin 10 through aligned openings 11 and 12 in a pair of members 13 and 14 to be secured together, the rivet pin having at one end a head 15 adapted to engage one of the members 13, 14, and having at its other end a portion 16 designed to project beyond the parts that are being secured together and having an annular groove 17 into which a collar 18 of aluminum or other malleable metal is forced by means of a tool 19. The groove 17 is defined generally by conical surfaces 20 and 21 connected by a curved surface. The angle of the surface 21 with reference to the longitudinal axis of the pin 10 is considerably greater than that of the surface 20. It is sufficiently obtuse so that the collar 18 will make adequate abutting contact therewith for transmitting tension loads from the pin to the member 14. It has been found quite satisfactory to arrange the surface 21 at an angle of 60 degrees with reference to the axis of the pin, and to form the surface 20 at an angle of approximately 90 degrees to the surface 21 and, consequently, 30 degrees with reference to the pin axis.

In the setting operation, the collar 18 is engaged by the conical mouth 22 of the tool 19 and forced inwardly by moving the tool 19 axially toward the member 14. A bucking bar 23 is used to engage the head of the rivet to support the pin 10 under the pressure of the setting tool 19.

Any excess metal sheared from the end of the collar 18 against the shearing edge 24 of the pin 10 is discharged from the tool through an opening 25.

In the past it has been customary to use a tool wherein the angle of the conical mouth 22 is the same as the angle of the surface 20, in order that the wall thickness of the collar 18 might be uniform in the formed head.

Our invention provides an arrangement wherein the conical mouth 22 of the tool 19 makes an angle that is substantially more acute with reference to the axis of the tool and pin than is the angle of the surface 20. Thus the surfaces 20 and 22 are arranged in outwardly diverging relation subtending between them an angle $a$. For the purpose of the present invention, we find that good results are secured where the angle $a$ is in the neighborhood of 5 degrees.

Figure 2:
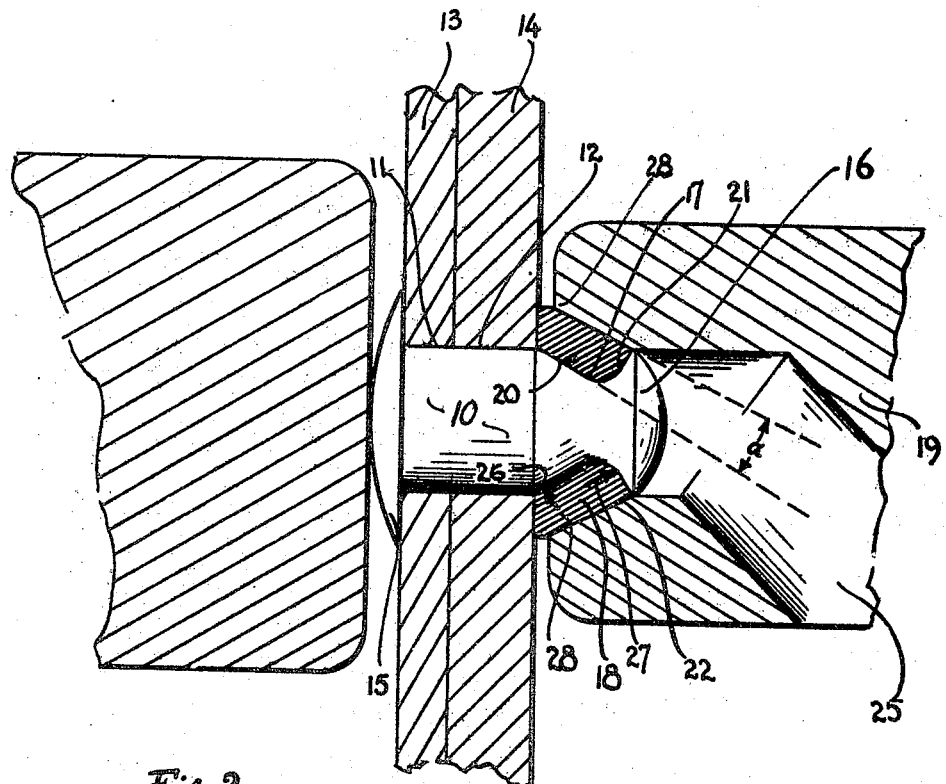
Fig. 2 is an enlarged sectional view showing the completion of the rivet setting operation and illustrating the tool in which the invention is embodied.

The mouth 22 at its outer extremity forms a relatively sharp corner with the end of the tool, in contrast to the rounded corner employed on the prior tool. The sharp corner has two functions. It confines the collar, where the tool nears the end of its stroke, so that the pressure against the collar may result in some flow of the metal of the collar in the direction opposite to that of tool movement as indicated by the arrow 27 in Fig. 2, thus setting the outer end of the collar firmly against the shoulder 21. Secondly, it presses the base of the collar firmly around the base of the conical surface 20 as indicated by the arrow 28.

More particularly, the annular groove 17 is made up of a frusto-conical base connected by a curved surface to a reversely-disposed frusto-conical top portion, and the tool includes a frusto-conical shaped interior surface. The angularity of such frusto-conically shaped interior surface of the tool with respect to the longitudinal axis of the rivet pin is more acute than the angle of the surface of the frusto-conical base of the annular groove with respect to such longitudinal axis of the rivet. Thus, movement of the tool over the collar results in a flow of the material of the collar inwardly into tight fitting engagement with the frusto-conical base and the curved surface of the annular groove and upwardly into tight fitting engagement with the surface of the reversely disposed frusto-conical top portion thereof as indicated by the arrows 27 and 28.

Under the older type of riveting operation, there was often a failure of the collar 18 to make complete contact with the shoulder 21 and there were also many instances where the collar 18 would gap away from the surface 20 at the base thereof as indicated by the numeral 26. The present invention eliminates both of these faults of the previous practice. The flow of metal toward the shoulder 21 is facilitated by the diverging angle between the tool surface 22 and the pin surface 20 in the direction of the shoulder 21.

The forces set up in the collar 18 as indicated by the arrows 27 and 28 result in the collar being placed under compression between the shoulder 21 and the member 14 and the pin 10 consequently being placed under tension to draw the members 13 and 14 tightly together. The result is a very tight joint.

The foregoing may be taken as illustrative of one form in which the invention may be embodied, it being our intention to cover in our claim the use of any equivalent arrangement or apparatus.

We claim as our invention:

The method of setting a malleable collar into an annular groove in a rivet pin, and which annular groove is made up of a frusto-conical base connected by a curved surface to a reversely disposed frusto-conical top portion, which consists in applying deforming pressure to the exterior of the collar by a tool having a frusto-conical interior surface, the angularity of which surface with respect to the longitudinal axis of the rivet pin is more acute than the angle of the surface of the frusto-conical base of the annular groove in the rivet pin with respect to the longitudinal axis of the rivet pin whereby movement of the tool over the collar results in flow of the material of the collar inwardly into tight fitting engagement with the frusto-conical base and the curved connecting surface of the annular groove and upwardly into tight fitting engagement with the surface of the reversely disposed frusto-conical top portion of said rivet pin groove.

PHILIP B. KELLER.
DONALD JELINEK.